(12) United States Patent
Zhao et al.

(10) Patent No.: US 11,083,320 B2
(45) Date of Patent: Aug. 10, 2021

(54) INTEGRATED WALL-BREAKING MACHINE AND SLOW JUICER STRUCTURE

(71) Applicant: ZHEJIANG LINIX MOTOR CO., LTD., Dongtang (CN)

(72) Inventors: Haiqiang Zhao, Dongyang (CN); Young Ki Kim, Gimhae-si (KR); Hyanggon Kim, Gimhae-si (KR)

(73) Assignees: ZHEJIANG LINIX MOTOR CO., LTD., Dongyang (CN); HUROM CO., LTD., Gyeongsangnam-Do (KR)

( * ) Notice: Subject to any disclaimer, the term of this patent is extended or adjusted under 35 U.S.C. 154(b) by 491 days.

(21) Appl. No.: 15/871,849

(22) Filed: Jan. 15, 2018

(65) Prior Publication Data
US 2019/0029457 A1    Jan. 31, 2019

(30) Foreign Application Priority Data
Jul. 31, 2017 (CN) .......................... 201710640260.9

(51) Int. Cl.
*A47J 19/02* (2006.01)
*A47J 19/06* (2006.01)
*A47J 43/08* (2006.01)

(52) U.S. Cl.
CPC ............... *A47J 19/02* (2013.01); *A47J 19/06* (2013.01); *A47J 43/08* (2013.01)

(58) Field of Classification Search
CPC .......... A47J 19/02; A47J 19/06; A47J 19/027; A47J 43/08; A47J 43/07; A47J 43/046; A47J 43/06; A47J 43/044; A47J 43/04; A47J 31/58

USPC ............................................ 99/501, 510–513
See application file for complete search history.

(56) References Cited

U.S. PATENT DOCUMENTS

| | | | | |
|---|---|---|---|---|
| 4,282,775 A * | 8/1981 | Van Dest | .................. | F16H 3/54 475/140 |
| 6,968,756 B2 * | 11/2005 | Folino | ..................... | F16H 25/06 475/183 |
| 8,713,984 B2 * | 5/2014 | Wilson, Jr. | ............. | B21D 7/024 72/449 |
| 8,950,076 B2 * | 2/2015 | Whited | ................. | B26B 25/002 30/276 |

* cited by examiner

*Primary Examiner* — Sarang Afzali
(74) *Attorney, Agent, or Firm* — Jiwen Chen; Jacobson Holman PLLC

(57) ABSTRACT

An integrated wall-breaking machine and slow juicer structure includes a housing; a driving motor linked with a first output shaft is provided within the housing; the first output shaft is linked with a second output shaft via a single-stage or a multi-stage transmission mechanism; a one-way bearing is fixed on the first output shaft; when the first output shaft rotates in one of a clockwise direction and a counterclockwise direction, an outer ring of the one-way bearing rotates and the second output shaft rotates; and when the first output shaft rotates in the other direction, an inner ring of the one-way bearing rotates and the outer ring thereof is locked. The wall-breaking machine and the slow juicer are integrated. By replacing different cutters and by rotating the first output shaft clockwise or counterclockwise, the wall-breaking function or the juicing function is realized.

14 Claims, 1 Drawing Sheet

INTEGRATED WALL-BREAKING MACHINE AND SLOW JUICER STRUCTURE

This application claims the priority benefit of Chinese Application No. 201710640260.9, filed Jul. 31, 2017, which is hereby incorporated by reference.

TECHNICAL FIELD OF THE INVENTION

The present invention relates to the field of household appliances and in particular to an appliance structure having functions of both a wall-breaking machine and a slow juicer.

BACKGROUND OF THE INVENTION

A wall-breaking machine can break the cell wall of vegetables and fruits and effectively extract phytochemicals so that nutrient substances are more easily absorbed by the body. The ingredients are almost pasty if the ingredients are processed by a wall-breaking machine, while juice can be extracted from the ingredients if the ingredients are processed by a slow juicer. The juice extracted from the ingredients by a slow juicer may be easily separated from the residue. Juice extracted from the ingredients by a wall-breaking machine and juice extracted from the ingredients by a slow juicer taste different. To meet the demands of family members having different tastes, some families may buy a wall-breaking machine and a slow juicer. Buying both a wall-breaking machine and a slow juicer causes large space occupancy and high cost.

SUMMARY OF THE INVENTION

An object of the present invention is to provide an integrated wall-breaking machine and slow juicer structure integrating a wall-breaking machine and a slow juicer.

For this purpose, the present invention employs the following technical solution. The present invention discloses an integrated wall-breaking machine and slow juicer structure, comprising a housing; a driving motor linked with a first output shaft is provided within the housing; the first output shaft is linked with a second output shaft via a single-stage or a multi-stage transmission mechanism; a one-way bearing is fixed on the first output shaft; when the first output shaft rotates in one of a clockwise direction and a counterclockwise direction, an outer ring of the one-way bearing rotates and the second output shaft rotates; and when the first output shaft rotates in the other direction, an inner ring of the one-way bearing rotates and the outer ring thereof is locked.

When in use of appliances having this structure of the present invention, a cutter is fixed at an end of the first output shaft so that the cutter will not come into contact with the second output shaft, and the driving motor is started to rotate the first output shaft; when the outer ring of the one-way bearing is locked, the first output shaft rotates quickly to realize the quick extraction and wall-breaking functions; when the outer ring of the one-way bearing rotates, the one-way bearing and the transmission mechanism provide damping, and in this case, the second output shaft rotates and the first output shaft rotates to realize the slow juicing function; a cutter is fixed at an end of the second output shaft so that the cutter will not come into contact with the first output shaft, and the driving motor is started to rotate the first output shaft and the outer ring of the one-way bearing, and in this case, the first output shaft is idle and the second output shaft rotates to realize the juicing function of the slow juicer. In the present invention, the wall-breaking machine and the slow juicer are integrated. By replacing different cutters and by rotating the first output shaft clockwise or counterclockwise, the wall-breaking function or the juicing function is realized.

Preferably, the second output shaft is sheathed on the first output shaft, and the first output shaft and the second output shaft are arranged coaxially. With such an arrangement, appliances having this structure of the present invention have smaller size and smaller space occupancy.

Preferably, the first output shaft is linked with the second output shaft via a single-stage transmission mechanism; the single-stage transmission mechanism comprises a first gear, a second planetary gear and a second planetary carrier; an outer ring of the one-way bearing is linked with the first gear; the first gear is meshed with the second planetary gear; the second planetary gear is fixed with the second planetary carrier via a second axle; the second planetary carrier is fixed with the second output shaft; and the first gear is formed with a through hole for the first output shaft to pass therethrough.

Preferably, the first output shaft is linked with the second output shaft via a two-stage transmission mechanism; the two-stage transmission mechanism comprises a first gear, a first planetary gear, a first planetary carrier, a second gear, a second planetary gear and a second planetary carrier; an outer ring of the one-way bearing is linked with the first gear; the first gear is meshed with the first planetary gear; the first planetary gear is fixed on a side of the first planetary carrier via a first axle and the second gear is fixed on the other side of the first planetary carrier; the second gear is meshed with the second planetary gear; the second planetary gear is fixed with the second planetary carrier via a second axle; the second planetary carrier is fixed with the second output shaft; the first gear, the first planetary carrier and the second gear are each formed with a through hole for allowing the first output shaft to pass therethrough.

Preferably, the first output shaft is linked with the second output shaft via a three-stage transmission mechanism; the three-stage transmission mechanism comprises a first gear, a first planetary gear, a first planetary carrier, a third gear, a third planetary gear, a third planetary carrier, a second gear, a second planetary gear and a second planetary carrier; an outer ring of the one-way bearing is linked with the first gear; the first gear is meshed with the first planetary gear; the first planetary gear is fixed on a side of the first planetary carrier via a first axle and the third gear is fixed on the other side of the first planetary carrier; the third gear is meshed with the third planetary gear; the third planetary gear is fixed on a side of the third planetary carrier via a third axle and the second gear is fixed on the other side of the third planetary carrier; the second gear is meshed with the second planetary gear; the second planetary gear is fixed with the second planetary carrier via a second axle; the second planetary carrier is fixed with the second output shaft; and the first gear, the first planetary carrier, the third gear, the third planetary carrier and the second gear are each formed with a through hole for allowing the first output shaft to pass therethrough.

A single-stage transmission or a two-stage transmission or a third-stage transmission or the like is selected as desired. The simultaneous rotation of the first output shaft and the second output shaft is realized by a planetary gear transmission mechanism, and the size of appliances having this structure of the present invention is reduced. It is well known that a ring gear may be provided on each of the outer side of the first planetary gear, the outer side of the second planetary gear, and the outer side of the third planetary gear.

Preferably, the outer ring of the one-way bearing is fixed with an inner wall of a bushing which is a ring-shaped structure; the first gear comprises a first gear portion I and a first gear portion II; on an outer wall of the first gear portion I, a threaded structure fitted with an outer wall of the first planetary gear is formed; and the first gear portion II is fixed within the bushing. In such an arrangement, the outer diameter of the first gear portion II is less than the outer diameter of the first in a case where the first gear is directly sheathed outside the one-way bearing. The inner edge of the first gear in the present invention is located on the inner side of the outer ring of the one-way bearing. The first gear may be made smaller so that the distance between the first planetary gear and the first gear becomes smaller. Accordingly, the space occupied by the transmission mechanism is reduced, and thus appliances having this structure of the present invention have a smaller size.

Preferably, an eccentricity-prevention bearing is sheathed on the first output shaft; an inner ring of the eccentricity-prevention bearing is fixed with the first output shaft and an outer ring thereof is linked and fixed with the second output shaft; and the second planetary carrier is formed with an accommodating groove for accommodating the eccentricity-prevention bearing, and the eccentricity-prevention bearing is located within the accommodating groove.

In the present invention, the first output shaft is relatively long. The arrangement of the eccentricity-prevention bearing prevents the eccentricity of an end of the first output shaft during the rotation. The accommodating groove is arranged on the second planetary carrier so that the second output shaft has a small diameter. In this way, the material consumption is reduced and the coordination between the second output shaft and the cutter is facilitated.

Preferably, the second output shaft is fixed with a plurality of fixed bearings; an inner ring of each of the fixed bearings is fixed with the second output shaft and an outer ring thereof is fixed with the housing; one axial end face of a fixed bearing closest to the second planetary carrier comes into contact with an end face of the second planetary carrier and the other axial end face thereof comes into contact with a circlip for holes, and a first annular groove or a first arc-shaped groove is formed on the housing to fit the circlip for holes; or the other axial end face of a fixed bearing closest to the second planetary carrier comes into contact with a circlip for shafts, and a first annular groove or a first arc-shaped groove is formed on the second output shaft to fit the circlip for shafts. Such an arrangement is designed for the fixation of the second output shaft. When there is only one fixed bearing, an end of the fixed bearing comes into contact with the second planetary carrier and the other end thereof is limited by the circlip for shafts. When there are at least two fixed bearings, a fixed bearing closest to the driving motor is limited by the circlip for holes and the second planetary carrier.

Preferably, the second planetary carrier and the second output shaft are integrally molded. Such an arrangement is convenient for the assembly of the present invention and makes the rotation of the second output shaft more stable.

Preferably, an end of the first output shaft away from the driving motor is a first fixed end, and an end of the second output shaft away from the driving motor is a second fixed end; and the first fixed end extends beyond the second output shaft. Such an arrangement is convenient for the assembly of the first output shaft with the cutter and also the assembly of the second output shaft with the cutter.

In the present invention, the wall-breaking machine and the slow juicer are integrated. By replacing different cutters and by rotating the first output shaft clockwise or counter-clockwise, the wall-breaking function or the juicing function is realized. Furthermore, the present invention also has the advantages of smaller size and smaller space occupancy.

DETAILED DESCRIPTION OF THE INVENTION

The present invention will be further described below by specific embodiments with reference to the accompanying drawings.

Figure 1:
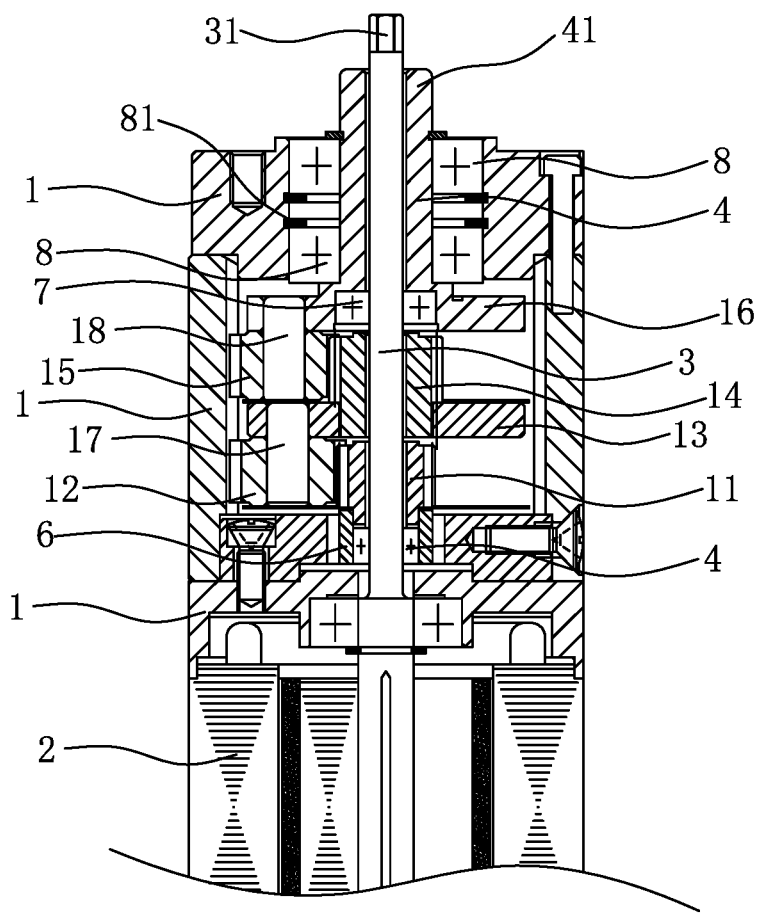
FIG. 1 is a structure diagram of the present invention.
Figure 2:
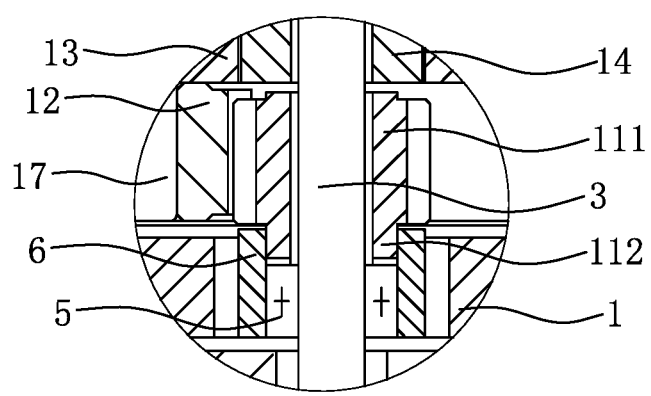
FIG. 2 is a structure diagram of coordination of a first gear and a one-way bearing, according to the present invention.

As shown in FIG. 1 and FIG. 2, an integrated wall-breaking machine and slow juicer structure comprises a housing 1; a driving motor 2 linked with a first output shaft 3 is provided within the housing 1; the first output shaft 3 is linked with a second output shaft 4 via a single-stage or a multi-stage transmission mechanism; a one-way bearing 5 is fixed on the first output shaft 3; when the first output shaft 3 rotates in a clockwise direction, an outer ring of the one-way bearing 5 rotates and the second output shaft 4 rotates; and when the first output shaft 3 rotates in a counterclockwise direction, an inner ring of the one-way bearing 5 rotates and the outer ring thereof is locked. The second output shaft 4 is sheathed on the first output shaft 3, and the first output shaft 3 and the second output shaft 4 are arranged coaxially. An end of the first output shaft 3 away from the driving motor 2 is a first fixed end 31, and an end of the second output shaft 4 away from the driving motor 2 is a second fixed end 41; and the first fixed end 31 extends beyond the second fixed end 41. An outer hexagonal structure for coordinating with a wall-breaking cutter is formed at the first fixed end 31, and an outer hexagonal structure for coordinating with a juicing cutter is formed at the second fixed end 41. The two-stage transmission mechanism comprises one first gear 11, three first planetary gears 12, one first planetary carrier 13, one second gear 14, three second planetary gears 15 and one second planetary carrier 16; the outer ring of the one-way bearing 5 is linked with the first gear 11; the first gear 11 is meshed with the first planetary gears 12; the first planetary gears 12 are fixed on a side of the first planetary carrier 13 via a first axle 17 and the second gear 14 is fixed on the other side of the first planetary carrier 13; the second gear 14 is meshed with the second planetary gears 15; the second planetary gears 15 is fixed with the second planetary carrier 16 via a second axle 18; the second planetary carrier 16 is fixed with the second output shaft 4; and the first gear 11, the first planetary carrier 13 and the second gear 14 are each formed with a through hole for allowing the first output shaft 3 to pass therethrough.

The outer ring of the one-way bearing 5 is fixed with an inner wall of a bushing 6 which is a ring-shaped structure; the first gear 11 comprises a first gear portion I 111 and a first gear portion II 112; on an outer wall of the first gear portion I 111, a threaded structure fitted with an outer wall of the first planetary gears 12 is formed; and the first gear portion II 112 is fixed within the bushing 6.

An eccentricity-prevention bearing 7 is sheathed on the first output shaft 3; an inner ring of the eccentricity-prevention bearing 7 is fixed with the first output shaft 3 and an outer ring thereof is fixed with the second planetary carrier 16; and the second planetary carrier 16 is formed with an accommodating groove for accommodating the eccentricity-prevention bearing 7, and the eccentricity-prevention bearing 7 is located within the accommodating groove. The second planetary carrier 16 and the second output shaft 4 are integrally molded.

The second output shaft 4 is fixed with two fixed bearings 8; an inner ring of each of the fixed bearings 8 is fixed with the second output shaft 4 and an outer ring thereof is fixed with the housing 1; one axial end face of a fixed bearing 8 closest to the second planetary carrier 16 comes into contact with an end face of the second planetary carrier 16 and the other axial end face thereof comes into contact with a circlip for holes 81, and a first annular groove is formed on the housing 1 to fit the circlip for holes 81.

When in use of appliances having this structure of the present invention, a wall-breaking cutter is fixed at a first fixed end of the first output shaft so that the all-breaking cutter will not come into contact with the second output shaft, and the driving motor is started to rotate the first output shaft; when the outer ring of the one-way bearing is locked, the first output shaft rotates quickly to realize the quick extraction and wall-breaking functions; when the outer ring of the one-way bearing rotates, the one-way bearing and the transmission mechanism provide damping, and in this case, the second output shaft rotates and the first output shaft rotates to realize the slow juicing function; a juicing cutter is fixed at a second fixed end of the second output shaft so that the juicing cutter will not come into contact with the first output shaft, and the driving motor is started to rotate the first output shaft and the outer ring of the one-way bearing, and in this case, the first output shaft is idle and the second output shaft rotates to realize the juicing function of the slow juicer. In the present invention, the wall-breaking machine and the slow juicer are integrated. By replacing different cutters and by rotating the first output shaft clockwise or counterclockwise, the wall-breaking function or the juicing function is realized.

The invention claimed is:
1. An integrated breaking machine and juicer structure comprising:
 a housing;
 a driving motor within the housing, the driving motor being linked with a first output shaft having an end at which a breaking cutter is fixed, the end of the first output shaft being located away from the driving motor; the first output shaft is linked with a second output shaft having an end at which a juice extraction cutter is fixed via a single-stage or a multi-stage transmission mechanism, the end of the second output shaft being located away from the driving motor; and
 a one-way bearing is fixed on the first output shaft;
 wherein the end of the first output shaft and the end of the second output shaft are located on same side of the motor; and
 wherein the second output shaft is hollow and sheathed on the first output shaft and the first output shaft and the second output shaft are arranged coaxially; when the first output shaft rotates in one of a clockwise direction and a counterclockwise direction, an outer ring of the one-way bearing rotates and the second output shaft rotates for juice extraction; and when the first output shaft rotates in a direction opposite to the one of the clockwise direction and the counterclockwise direction, an inner ring of the one-way bearing rotates and the outer ring thereof is locked for cutting by the breaking cutter; and
 wherein the end of the first output shaft extends beyond of the end of the second output shaft.

2. The integrated breaking machine and juicer structure according to claim 1, characterized in that the first output shaft is linked with the second output shaft via a single-stage transmission mechanism; the single-stage transmission mechanism comprises a first gear, a first planetary gear and a first planetary carrier; the outer ring of the one-way bearing is linked with the first gear; the first gear is meshed with the first planetary gear; the first planetary gear is fixed with the first planetary carrier via a first axle; the first planetary carrier is fixed with the second output shaft; and the first gear is formed with a through hole for allowing the first output shaft to pass therethrough.

3. The integrated breaking machine and juicer structure according to claim 2, characterized in that an eccentricity-prevention bearing is sheathed on the first output shaft; an inner ring of the eccentricity-prevention bearing is fixed with the first output shaft and an outer ring thereof is linked and fixed with the second output shaft; and the first planetary carrier is formed with an accommodating groove for accommodating the eccentricity-prevention bearing, and the eccentricity-prevention bearing is located within the accommodating groove.

4. The integrated breaking machine and juicer structure according to claim 3, characterized in that the second output shaft is fixed with a plurality of fixed bearings; an inner ring of each of the fixed bearings is fixed with the second output shaft and an outer ring thereof is fixed with the housing; one axial end face of a fixed bearing closest to the first planetary carrier comes into contact with an end face of the first planetary carrier and the other axial end face thereof comes into contact with a circlip for holes, and a first annular groove or a first arc-shaped groove is formed on the housing to fit the circlip for holes; or the other axial end face of a fixed bearing closest to the first planetary carrier comes into contact with a circlip for shafts, and a first annular groove or a first arc-shaped groove is formed on the second output shaft to fit the circlip for shafts.

5. The integrated breaking machine and juicer structure according to claim 2, characterized in that the outer ring of the one-way bearing is fixed with an inner wall of a bushing which is a ring-shaped structure; the first gear comprises a first gear portion part one and a first gear portion part two; on an outer wall of the first gear portion part one, a threaded structure fitted with an outer wall of the first planetary gear is formed; and the first gear portion part two is fixed within the bushing.

6. The integrated breaking machine and juicer structure according to claim 2, characterized in that the first planetary carrier and the second output shaft are integrally molded.

7. The integrated breaking machine and juicer structure according to claim 1, characterized in that the first output shaft is linked with the second output shaft via a two-stage transmission mechanism; the two-stage transmission mechanism comprises a first gear, a first planetary gear, a first planetary carrier, a second gear, a second planetary gear and a second planetary carrier; the outer ring of the one-way bearing is linked with the first gear; the first gear is meshed with the first planetary gear; the first planetary gear is fixed on a side of the first planetary carrier via a first axle and the second gear is fixed on other side of the first planetary carrier; the second gear is meshed with the second planetary gear; the second planetary gear is fixed with the second planetary carrier via a second axle; the second planetary carrier is fixed with the second output shaft; and the first gear, the first planetary carrier and the second gear are each formed with a through hole for allowing the first output shaft to pass therethrough.

8. The integrated breaking machine and juicer structure according to claim 7, characterized in that the outer ring of the one-way bearing is fixed with an inner wall of a bushing which is a ring-shaped structure; the first gear comprises a first gear portion part one and a first gear portion part two; on an outer wall of the first gear portion part one, a threaded structure fitted with an outer wall of the first planetary gear is formed; and the first gear portion part two is fixed within the bushing.

9. The integrated breaking machine and juicer structure according to claim 7, characterized in that an eccentricity-prevention bearing is sheathed on the first output shaft; an inner ring of the eccentricity-prevention bearing is fixed with the first output shaft and an outer ring thereof is linked and fixed with the second output shaft; and the second planetary carrier is formed with an accommodating groove for accommodating the eccentricity-prevention bearing, and the eccentricity-prevention bearing is located within the accommodating groove.

10. The integrated breaking machine and juicer structure according to claim 7, characterized in that the second planetary carrier and the second output shaft are integrally molded.

11. The integrated breaking machine and juicer structure according to claim 1, characterized in that the first output shaft is linked with the second output shaft via a three-stage transmission mechanism; the three-stage transmission mechanism comprises a first gear, a first planetary gear, a first planetary carrier, a second gear, a second planetary gear, a second planetary carrier, a third gear, a third planetary gear and a third planetary carrier; the outer ring of the one-way bearing is linked with the first gear; the first gear is meshed with the first planetary gear; the first planetary gear is fixed on a side of the first planetary carrier via a first axle and the second gear is fixed on other side of the first planetary carrier; the second gear is meshed with the second planetary gear; the second planetary gear is fixed on a side of the second planetary carrier via a second axle and the third gear is fixed on other side of the second planetary carrier; the third gear is meshed with the third planetary gear; the third planetary gear is fixed with the third planetary carrier via a third axle; the third planetary carrier is fixed with the second output shaft; and the first gear, the first planetary carrier, the second gear, the second planetary carrier and the third gear are each formed with a through hole for allowing the first output shaft to pass therethrough.

12. The integrated breaking machine and juicer structure according to claim 11, characterized in that the outer ring of the one-way bearing is fixed with an inner wall of a bushing which is a ring-shaped structure; the first gear comprises a first gear portion part one and a first gear portion part two; on an outer wall of the first gear portion part one, a threaded structure fitted with an outer wall of the first planetary gear is formed; and the first gear portion part two is fixed within the bushing.

13. The integrated breaking machine and juicer structure according to claim 11, characterized in that an eccentricity-prevention bearing is sheathed on the first output shaft; an inner ring of the eccentricity-prevention bearing is fixed with the first output shaft and an outer ring thereof is linked and fixed with the second output shaft; and the third planetary carrier is formed with an accommodating groove for accommodating the eccentricity-prevention bearing, and the eccentricity-prevention bearing is located within the accommodating groove.

14. The integrated breaking machine and juicer structure according to claim 11, characterized in that the third planetary carrier and the second output shaft are integrally molded.

\* \* \* \* \*